US012808432B2

(12) United States Patent
Bertolini et al.

(10) Patent No.: US 12,808,432 B2
(45) Date of Patent: Nov. 24, 2026

(54) PINION BEARING UNIT

(71) Applicant: Aktiebolaget SKF, Gothenburg (SE)

(72) Inventors: Andrea A. Bertolini, Carrara (IT); Pasquale Frezza, Aversa (IT); Alessio Nebbia Colomba, Pisa (IT); Renato Berti, Massa (IT)

(73) Assignee: Aktiebolaget SKF, Gothenburg (SE)

( * ) Notice: Subject to any disclaimer, the term of this patent is extended or adjusted under 35 U.S.C. 154(b) by 40 days.

(21) Appl. No.: 18/735,311

(22) Filed: Jun. 6, 2024

(65) Prior Publication Data

US 2024/0418221 A1 Dec. 19, 2024

(30) Foreign Application Priority Data

Jun. 14, 2023 (IT) ........................ 102023000012225

(51) Int. Cl.

| | |
|---|---|
| ***F16C 19/06*** | (2006.01) |
| ***F16C 35/063*** | (2006.01) |
| ***F16H 57/00*** | (2012.01) |
| ***F16H 57/02*** | (2012.01) |
| ***F16H 57/023*** | (2012.01) |

(52) U.S. Cl.

CPC ......... *F16H 57/0031* (2013.01); *F16C 19/06* (2013.01); *F16C 35/063* (2013.01); *F16H 57/023* (2013.01); *F16C 2361/61* (2013.01)

(58) Field of Classification Search

CPC .... F16C 19/06; F16C 35/063; F16C 2361/61; F16H 57/0031; F16H 57/023; F16H 2057/085

See application file for complete search history.

(56) References Cited

FOREIGN PATENT DOCUMENTS

| | | | | | |
|---|---|---|---|---|---|
| CN | 105179229 | A | * | 12/2015 | |
| CN | 111043279 | A | | 4/2020 | |
| CN | 112065956 | A | | 11/2020 | |
| DE | 102021128579 | A1 | * | 5/2022 | .............. F16C 33/64 |
| EP | 1659300 | A1 | * | 5/2006 | .............. F16B 21/18 |
| KR | 20050096712 | A | | 10/2005 | |
| KR | 100721665 | B1 | | 5/2007 | |
| KR | 20100079237 | A | * | 7/2010 | ........... F16C 35/067 |

OTHER PUBLICATIONS

DESCRIPTION_CN105179229A.*

Examination Report of the National Intellectual Property Office of Italy in Application No. 102023000012225, dated Dec. 6, 2023; 9pgs.

* cited by examiner

*Primary Examiner* — Phillip A Johnson

(74) *Attorney, Agent, or Firm* — Stinson LLP

(57) ABSTRACT

A pinion bearing unit (10) has a pinion (20) with a cylindrical and radially internal seat (21), and a bearing unit (30) housed inside the seat (21). The bearing unit (30) has a radially outer ring (31) rigidly connected to the pinion (20) and a radially inner ring (34). The pinion (20) has an axially inner and radially inner shoulder (40) which axially delimits the seat (21) and prevents the pinion (20) from moving axially outwards with respect to the bearing unit (30). The pinion bearing unit (10) does not have a retaining ring in the seat (21).

6 Claims, 2 Drawing Sheets

PINION BEARING UNIT

CROSS-REFERENCE TO RELATED APPLICATION

This application claims priority to Italian Application No. 102023000012225, filed Jun. 14, 2023, the entirety of which is hereby incorporated by reference.

FIELD

The present disclosure relates to a pinion bearing unit. The unit is preferably, but not exclusively, used in motion transmitting units for industrial applications.

BACKGROUND

In industrial applications, pinion bearing units which are mainly used as chain tensioner in units for transmitting the motion of driving or operating machines.

The pinion is provided with a radially internal cylindrical seat, in which a bearing unit is housed.

The bearing unit typically comprises a radially inner ring, usually mounted on a central axis of the machine, and a radially outer ring, rigidly connected to the pinion. The relative rotation of the outer ring with respect to the inner ring is ensured by a plurality of rolling bodies, typically balls. The balls are designed to roll inside a radially outer raceway formed on the inner ring and a corresponding radially inner raceway formed on the outer ring.

Due to the stresses that occur during the operation of the unit and, in particular, due to the vibrational motion induced on the pinion by the machine, undesired demounting of the pinion bearing unit can occur.

Usually, in this type of applications, the loads are predominantly radial since the pinion is used to tension a motion transmitting chain. However, the vibrations induced by the machine can also determine axial loads on the unit. The chain is locked between several gears, and thus it is difficult for it to be demounted by such axial loads. By contrast, the prolonged effect of the vibrations over time can lead to demounting of the pinion with respect to the bearing unit: the bearing unit is locked on the central axis, but the pinion may move axially and be demounted from the bearing unit, thus falling down.

To overcome this drawback, two solutions aimed at mutually securing the bearing unit and the pinion are known. A first solution provides for the bearing unit to be mounted with interference inside the seat of the pinion. However, this solution entails the risk that high interference values between the bearing unit and the pinion can cause the inner geometry of the bearing unit to deform. Conversely, this solution is not very effective when low interference values are used, allowing undesired demounting of the pinion bearing unit to still occur. A second solution provides for the use of a retaining ring, for example a Seeger ring, which can ensure the mutual axial locking between the outer ring of the bearing unit and the pinion. However, this second solution also has some drawbacks. Firstly, it is necessary to design an axially longer pinion in order for there to be enough space for insertion of the retaining ring. Second, it is necessary to use an additional component. Third, the presence of a further component moreover entails longer mounting and demounting times.

SUMMARY

The present disclosure is therefore intended to provide a pinion bearing unit that does not have the drawbacks described above.

Therefore, the present disclosure provides a pinion bearing unit having the features set out in the independent claim attached to the present description.

Further embodiments of the present disclosure, which are preferred and/or particularly advantageous, are described according to the features set out in the attached dependent claims.

BRIEF DESCRIPTION OF THE DRAWINGS

The present disclosure will now be described with reference to the attached drawings, which show a non-limiting example embodiment thereof, in which.

DETAILED DESCRIPTION

Figure 1:
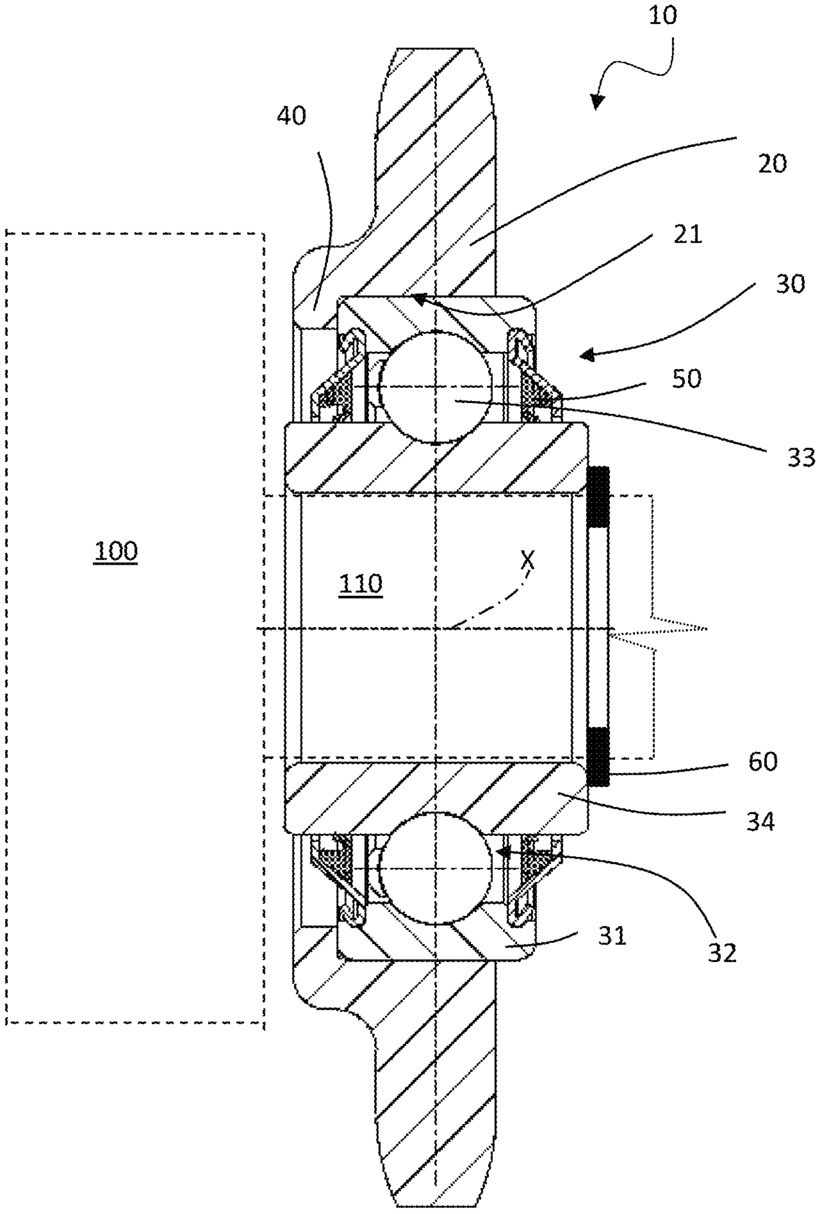
FIG. 1 shows a cross section of a pinion bearing unit in a preferred embodiment of the present disclosure.

With reference to FIG. 1, a pinion bearing unit 10 according to the present disclosure comprises a pinion 20 and a bearing unit 30 and is applied to a driving or operating machine 100 of the known type and shown purely schematically.

The pinion is provided with a radially internal cylindrical seat 21, and with an axially outer and radially inner shoulder 40 which axially delimits the seat 21. The bearing unit 30 is housed inside the seat 21.

The bearing unit 30 has a central axis of rotation X and comprises:

- a radially outer ring 31, rigidly connected to the pinion 20,
- a radially inner ring 34, rigidly connected to a shaft 110 (of the known type and thus only shown schematically) of the machine 100,
- a row 32 of rolling bodies 33, in this case balls, interposed between the radially outer ring 31 and the radially inner ring 34, and
- at least one sealing device 50 in order to protect the bearing unit 30 from external contaminants.

Throughout the present description and in the claims, terms and expressions indicating positions and orientations, such as "radial" and "axial", are to be understood with reference to the central axis of rotation X of the bearing unit 30. Furthermore, the term "axially internal" should be understood as the axial direction towards the body of the machine to which the pinion bearing unit 10 is applied. The opposite direction will obviously be indicated by the term "axially external".

Figure 2:
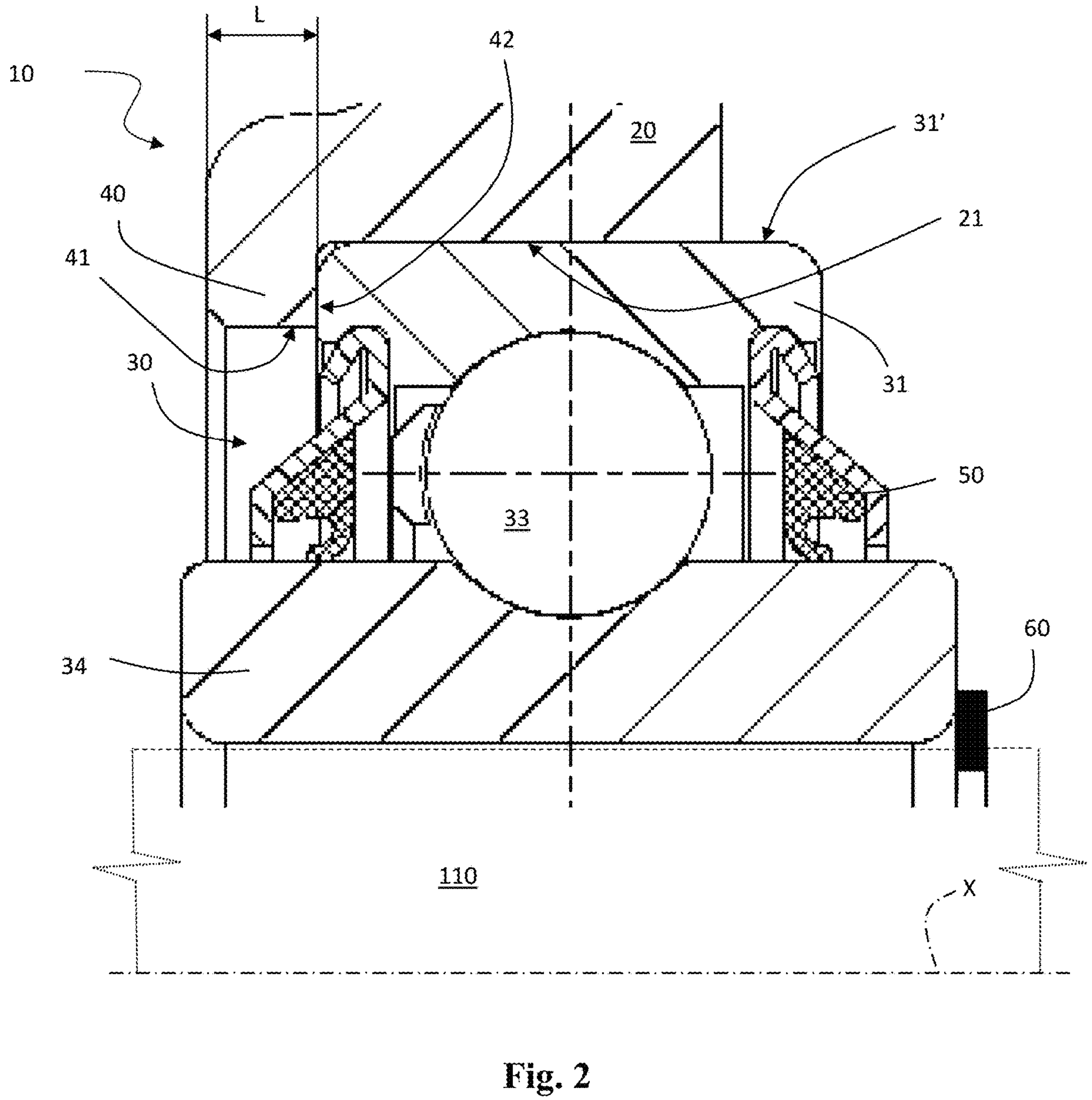
FIG. 2 shows a detail of the unit in FIG. 1.

According to one design, with reference also to FIG. 2, the pinion 20 is thus produced in such a way as to be able to solve the problem of the undesired demounting from the bearing unit 30, namely to prevent the axial movement of the pinion with respect to the bearing unit 30.

This is achieved by means of the axially inner shoulder 40 which axially delimits the seat 21, inside which the bearing unit 30 is mounted. Indeed, the shoulder 40 prevents the pinion 20 from being able to move, with respect to the bearing unit 30, in the axially outer direction and thus becoming demounted and falling down.

This solution means that the pinion bearing unit 10 does not require a retaining ring, for example a Seeger ring, arranged in the seat 21 in order to ensure the axial locking between the pinion and the bearing.

More particularly, the shoulder 40 is provided with a free and inner cylindrical surface 41 which is radially inside a radially outer cylindrical surface 31' of the radially outer ring 31. In this way, an annular abutment surface 42 transverse to the axis X is formed on the shoulder 40 in such a way as to form an axial abutment for said radially outer ring 31.

Advantageously, the shoulder 40 of the pinion has the minimum axial width L sufficient to support the axial loads, for example a width of between 2.4 mm and 2.6 mm. This reduced axial width limits the increase in the axial dimensions of the pinion 20 due to the presence of the shoulder 40 as much as possible. In any case, the axial width of the pinion 20 is still smaller than the axial width that the pinion requires using the Seeger ring according to the prior art in order to ensure the axial locking between the bearing unit and the pinion. Indeed, the solution of the Seeger ring requires both the axial dimensions for the seat of the ring and the axial dimensions for ensuring a shoulder, downstream of the Seeger ring, necessary for withstanding the axial loads. Furthermore, since the seat for the Seeger ring constitutes a structural weakening of the pinion, the solution according to the prior art requires a further increase in the axial dimension of the pinion in order to compensate for the corresponding reduction in material due to the creation of the Seeger ring seat.

However, in the axially inner direction, there is no possibility of the pinion falling since it would be stopped by the frame of the machine 100. In any case, it is preferably to avoid contact between the pinion 20 and the frame of the machine 100 and, in particular, to prevent the mutual axial movement between the pinion and the radially outer ring of the bearing unit, in order to prevent the occurrence of wear phenomena between the contacting surfaces.

Advantageously, it is therefore expedient to provide a slight interference between the seat 21 of the pinion 20 and the radially outer cylindrical surface 31' of the radially outer ring 31 of the bearing unit. The interference value to be adopted may nevertheless be lower than the interference value required according to the prior art for mutually securing the bearing unit and the pinion in the absence of a mechanical stop (the shoulder): indeed, whilst it is necessary to use the M7 tolerance class according to the prior art, according to the present disclosure it will be enough to adopt the N7 tolerance class which provides lower interference values than the preceding class. Considering, for a typical application, a bearing unit outer diameter of 40 mm, there is thus a change from an interference of between 0.08 mm and 0.33 mm (M7 tolerance class) to an interference of between 0 and 0.25 mm (N7 tolerance class). Using smaller interference values avoids any risk of deformation of the inner geometry of the bearing and also allows the radially outer ring to be correctly mounted near the shoulder 40 against the annular surface 42 thereof.

Advantageously, in order to avoid axial movements of the pinion bearing unit 10 overall, the bearing unit 30 may be axially locked so as to secure the radially inner ring 34 to the shaft 110 of the machine 100 by means of a retaining ring 60, for example a Seeger ring, or a locking pin.

From the point of view of the production process, the solution according to the present disclosure does not require additional steps with respect to the one necessary for the known implementations. Indeed, operating according to the prior art, producing the seat of the bearing unit in the pinion, both using an interference between the pinion and the outer ring and using a Seeger ring, still requires the performance of precision mechanical machining. The present solution likewise requires the same operation, but does not require any additional processing.

In summary, according to the present disclosure the solution concerning the pinion bearing unit makes it possible to not have mutual axial movements between the bearing unit and the pinion and therefore to avoid accidental demounting.

In addition to the embodiment of the present disclosure as described above, it should be understood that there are numerous other variants. It should also be understood that these embodiments are solely exemplary and do not limit the scope of the present disclosure, its applications, or its possible configurations. On the contrary, although the above description enables those skilled in the art to implement the present disclosure according to at least one exemplary embodiment thereof, it should be understood that numerous variants of the described components are possible, without thereby departing from the scope of the present disclosure as defined in the appended claims, interpreted literally and/or according to their legal equivalents.

What is claimed is:

1. A pinion bearing unit comprising:

a pinion including a cylindrical and radially internal seat and a shoulder, the shoulder being axially outer and radially internal relative to the seat, the shoulder axially delimiting the seat and being configured to prevent the pinion from moving axially outwards with respect to the pinon bearing unit; and a bearing unit housed inside the seat, the bearing unit includes a radially outer ring integrally connected to the pinion and a radially inner ring;

wherein the pinion is free of a retaining ring located in the seat; and wherein an interference between the seat of the pinion and a radially outer cylindrical surface of the radially outer ring is comprised in the tolerance class N7.

2. The pinion bearing unit according to claim 1, wherein the interference is between 0 mm and 0.25 mm.

3. The pinion bearing unit according to claim 2, wherein the bearing unit has a central axis of rotation, and wherein the shoulder of the pinion has an annular abutment surface transverse to the central axis of rotation that defines an axial abutment for the radially outer ring of the bearing unit.

4. The pinion bearing unit according to claim 3, wherein the shoulder of the pinion has an axial width ranging between 2.4 mm and 2.6 mm.

5. The pinion bearing unit according to claim 1, wherein the bearing unit has a central axis of rotation, and wherein the shoulder of the pinion has an annular abutment surface transverse to the central axis of rotation that defines an axial abutment for the radially outer ring of the bearing unit.

6. The pinion bearing unit according to claim 5, wherein the shoulder of the pinion has an axial width ranging between 2.4 mm and 2.6 mm.

* * * * *